United States Patent
Lu

(10) Patent No.: US 8,271,116 B2
(45) Date of Patent: Sep. 18, 2012

(54) SYSTEM AND METHOD FOR CONTROLLING HOUSEHOLD APPLIANCES BY PROGRAMMING

(76) Inventor: Ming-Wei Lu, Taipei (TW)

( * ) Notice: Subject to any disclaimer, the term of this patent is extended or adjusted under 35 U.S.C. 154(b) by 447 days.

(21) Appl. No.: 12/633,857

(22) Filed: Dec. 9, 2009

(65) Prior Publication Data

US 2011/0137439 A1 Jun. 9, 2011

(51) Int. Cl.
*G06F 17/00* (2006.01)
(52) U.S. Cl. .......................................... 700/94
(58) Field of Classification Search .................... 700/94; 348/552, 734
See application file for complete search history.

(56) References Cited

U.S. PATENT DOCUMENTS

| | | | | |
|---|---|---|---|---|
| 6,876,310 B2* | 4/2005 | Dunstan | ................. | 340/8.1 |
| 7,865,568 B1* | 1/2011 | Redi | ................. | 709/217 |
| 2003/0058269 A1* | 3/2003 | Dunstan | ................. | 345/734 |
| 2008/0137572 A1* | 6/2008 | Park et al. | ................. | 370/310 |
| 2009/0239587 A1* | 9/2009 | Negron et al. | ................. | 455/566 |
| 2010/0165216 A1* | 7/2010 | Beals | ................. | 348/734 |
| 2011/0063506 A1* | 3/2011 | Reams | ................. | 348/553 |

* cited by examiner

*Primary Examiner* — Andrew C Flanders

(57) ABSTRACT

A household appliances control system includes an information server comprising a main database, a line detection module, and a wireless module; device servers comprising a device database, a device detection module, a control module, and a wireless module and connected to the information server wirelessly or by wire; a control setting device connected to each of the device servers wirelessly or by wire; a wall mounted control connected to each of the device servers wirelessly or by wire; a voice control connected to each of the device servers wirelessly or by wire; a remote control connected to each of the device servers wirelessly; sensors connected to each of the device servers wirelessly or by wire; and household appliances connected to each of the device servers wirelessly or by wire. A household appliances control method is also provided.

1 Claim, 11 Drawing Sheets

| device database | |
|---|---|
| database name | data name |
| 311 user entry database | user name and password — 311D |
| 312 control interface definition database | wall mounted control link setting — 312D1 |
| | voice control link setting — 312D2 |
| | remote control link setting — 312D3 |
| 313 device control state database | sensor control setting — 313D1 |
| | device control setting — 313D2 |
| 314 device input database | sensor signals — 314D1 |
| | device signals — 314D2 |
| 315 device detection report database | device detection result — 315D |
| 316 programming control setting database | programming control setting — 316D1 |
| | wall mounted control programming control setting — 316D2 |
| | voice control programming control setting — 316D3 |
| | remote control programming control setting — 316D4 |
| | programming control stack setting — 316D5 |
| | wall mounted control programming control stack setting — 316D6 |
| | voice control programming control stack setting — 316D7 |
| | remote control programming control stack setting — 316D8 |
| 317 programming control publication database | programming control subject description — 317D1 |
| | programming control stack subject description — 317D2 |
| 318 programming control subscription database | programming control subject description publication subscription — 318D1 |
| | programming control stack subject description publication subscription — 318D2 |

FIG. 6

| DB type | DB name | Ctrl mode | Data name | Data description | Corresponding device/module |
|---|---|---|---|---|---|
| Device database (DB) | User entry DB | Basic | Username and password | | |
| | Ctrl interface definition DB | Basic | Wall mounted ctrl link setting | Sensor and/or household appliance connected to wall mounted ctrl | Wall mounted ctrl |
| | | | Voice ctrl link setting | Sensor and/or household appliance connected to voice ctrl | Voice ctrl |
| | | | Remote ctrl (RC) link setting | Sensor and/or household appliance connected to RC | RC |
| | Device ctrl state DB | Basic | Sensor ctrl setting | Sensor ctrl state setting | sensor |
| | | | Device ctrl setting | Device ctrl state setting | device |
| | Device input DB | Basic | Sensor signals | Environment state sensed by sensor or operational result | sensor |
| | | | Sensor signals | Environment state sensed by household appliance or op result | device |
| | Device detection report DB | Basic | Device detection result | User states of ctrl setting device, wall mounted ctrl, voice ctrl, RC, sensor and household appliance | Device detection |

| DB type | DB name | Ctrl mode | Data name | Data description | Corresponding device/module |
|---|---|---|---|---|---|
| Device DB | Prgm-ing ctrl setting DB | Prgm-ing ctrl mode | Programming ctrl setting | Set use states of sensors and/or household appliances | Sensor and/or household appliance |
| | | | Wall mounted ctrl programming ctrl setting | Set use states of sensors and/or household appliances | Wall mounted ctrl |
| | | | Voice ctrl programming ctrl setting | Set use states of sensors and/or household appliances | Voice ctrl |
| | | | RC programming ctrl setting | Set use states of sensors and/or household appliances | RC |
| | | Prgm-ing ctrl stack mode | Programming ctrl stack setting | Set use states of sensor and/or household appliances connected to device server | Prgm-ing ctrl subject description pub subscription data |
| | | | Wall mounted ctrl prgm-ing ctrl stack setting | Set use states of device server and sensors and/or household appliances connected | Prgm-ing ctrl stack setting data |
| | | | Voice ctrl programming ctrl stack setting | Set use states of device server and sensors and/or household appliances connected | Prgm-ing ctrl stack setting data |
| | | | RC programming ctrl stack setting | Set use states of device server and sensors and/or household appliances connected | Prgm-ing ctrl stack setting data |

| DB type | DB name | Ctrl mode | Data name | Data description | Corresponding device/module |
|---|---|---|---|---|---|
| Device DB | Programming ctrl publication DB | Prgm-ing | Programming ctrl subject description | Set user states of device servers and sensors and/or household appliances connected thereto | Programming ctrl setting data |
| | | Prgm-ing | Programming ctrl stack subject description | Set user states of device servers and sensors and/or household appliances connected thereto | Programming ctrl stack setting data |
| | Programming ctrl subscription DB | Prgm-ing | Programming ctrl subject description publication subscription | Programming ctrl subject description stored in device servers | Programming ctrl subject description publication data |
| | | Prgm-ing | Programming ctrl stack subject description publication subscription | Programming ctrl stack subject description stored in device servers | Programming ctrl stack subject description publication data |

| DB type | DB name | Ctrl mode | Data name | Data description | Corresponding device/module |
|---|---|---|---|---|---|
| Device DB | Prgm-ing ctrl publication DB | Prgm-ing ctrl mode | Prgm-ing ctrl subject description notice | Publishing prgm-ing ctrl subject description data on info server | Prgm-ing ctrl subject description data |
| | | Prgm-ing ctrl stack mode | Prgm-ing ctrl stack subject description publication notice | Publishing prgm-ing ctrl syack subject description data on info server | Prgm-ing ctrl stack subject description data |
| | Prgm-ing ctrl subscription record DB | Prgm-ing ctrl mode | Prgm-ing ctrl subject description publication subscription record | storing prgm-ing ctrl subject description data in info server | Prgm-ing ctrl subject description publication data |
| | | Prgm-ing ctrl stack mode | Prgm-ing ctrl stack subject description publication subscription notice | storing prgm-ing ctrl stack subject description data in info server | Prgm-ing ctrl stack subject description publication data |
| | Publication notice DB | Prgm-ing ctrl mode | Publication notice | Publishing prgm-ing ctrl subject description data on info server | Prgm-ing ctrl stack subject description publication data |
| | | Prgm-ing ctrl stack mode | Publication notice | Publishing prgm-ing ctrl stack subject description data on info server | Prgm-ing ctrl stack subject description data |
| | Line detection report DB | Basic | Line detection result | detecting data comm state of household appliance connected to info server | Line detection result |

SYSTEM AND METHOD FOR CONTROLLING HOUSEHOLD APPLIANCES BY PROGRAMMING

BACKGROUND OF THE INVENTION

1. Field of Invention

The invention relates to household appliances control and more particularly to a ZigBee based smart system and method for controlling household appliances by programming.

2. Description of Related Art

Many household appliances such as TVs, DVDs, and air conditioners can be controlled by remote controls. In short, the remote controls (RCs) communicate to the household appliance via infrared (IR) signals. However, it is typical for a specific household appliance (e.g., TV) having a specific RC for operation. Hence, a home may own a number of RCs. This is not desired.

ZigBee is targeted at radio-frequency (RF) applications that require a low data rate, long battery life, and secure networking. Also, application areas of ZigBee have included household appliances in recent years. However, such technology is still immature as the inventor is aware. Thus, a need for improvement exists.

SUMMARY OF THE INVENTION

It is therefore one object of the invention to provide a system for controlling household appliances by programming.

It is another object of the invention to provide a method for controlling household appliances by programming.

The above and other objects, features and advantages of the invention will become apparent from the following detailed description taken with the accompanying drawings.

BRIEF DESCRIPTION OF THE DRAWINGS

FIG. 6 is a detailed block diagram of device database;

FIG. 8 is a table of the device database;

FIG. 9 is another table of the device database;

FIG. 10 a further table of the device database; and

FIG. 11 a table of the main database.

DETAILED DESCRIPTION OF THE INVENTION

Figure 1:
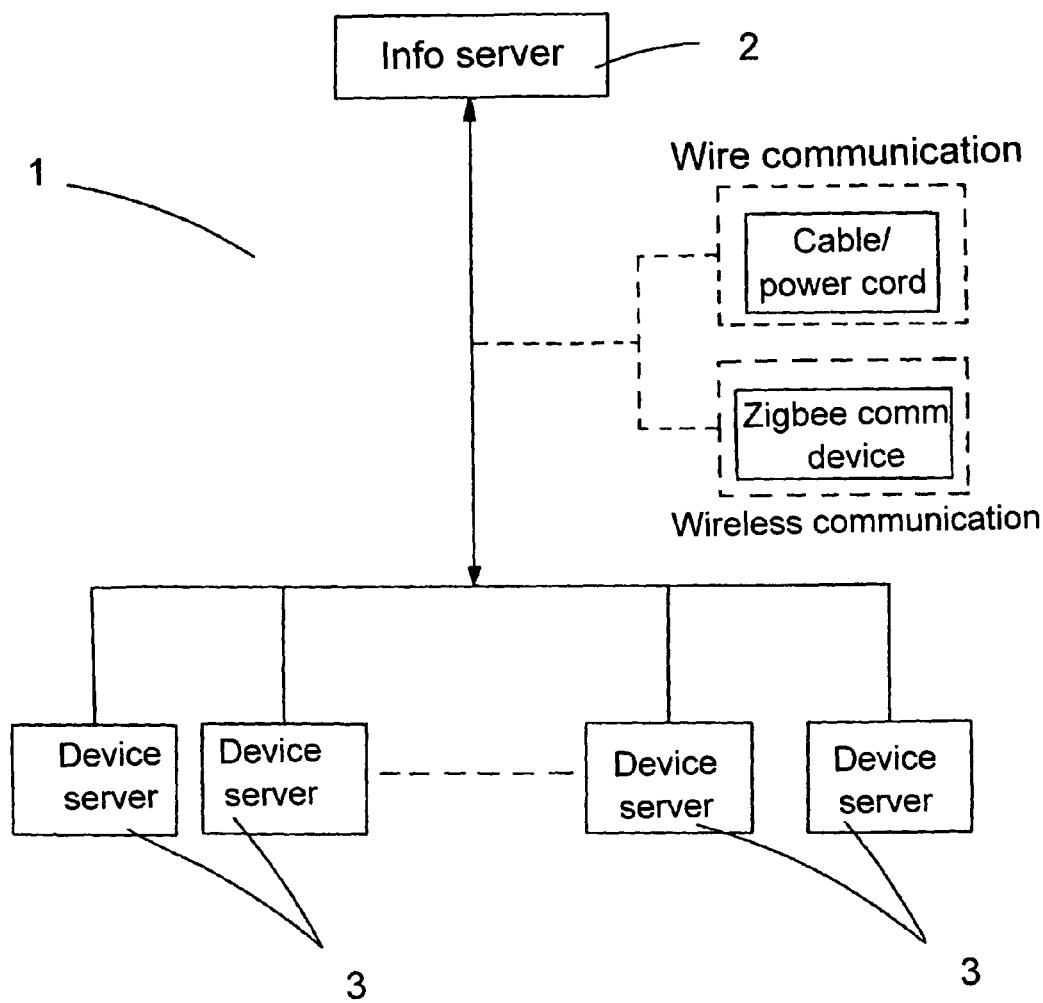
FIG. 1 is a block diagram of a system for controlling household appliances by programming according to the invention.
Figure 2:
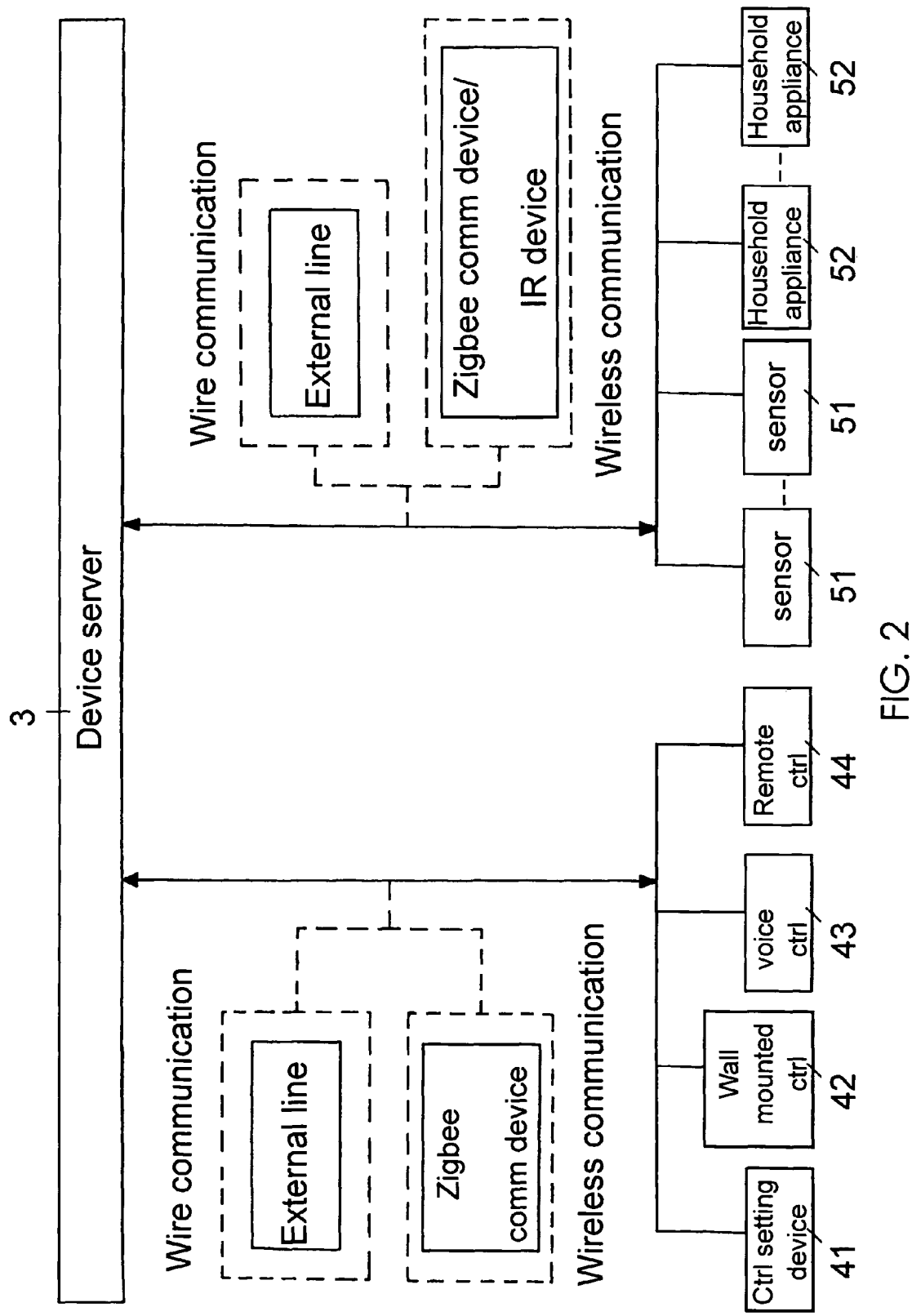
FIG. 2 is a detailed block diagram of the device server and associated components shown in FIG. 1.
Figure 3:
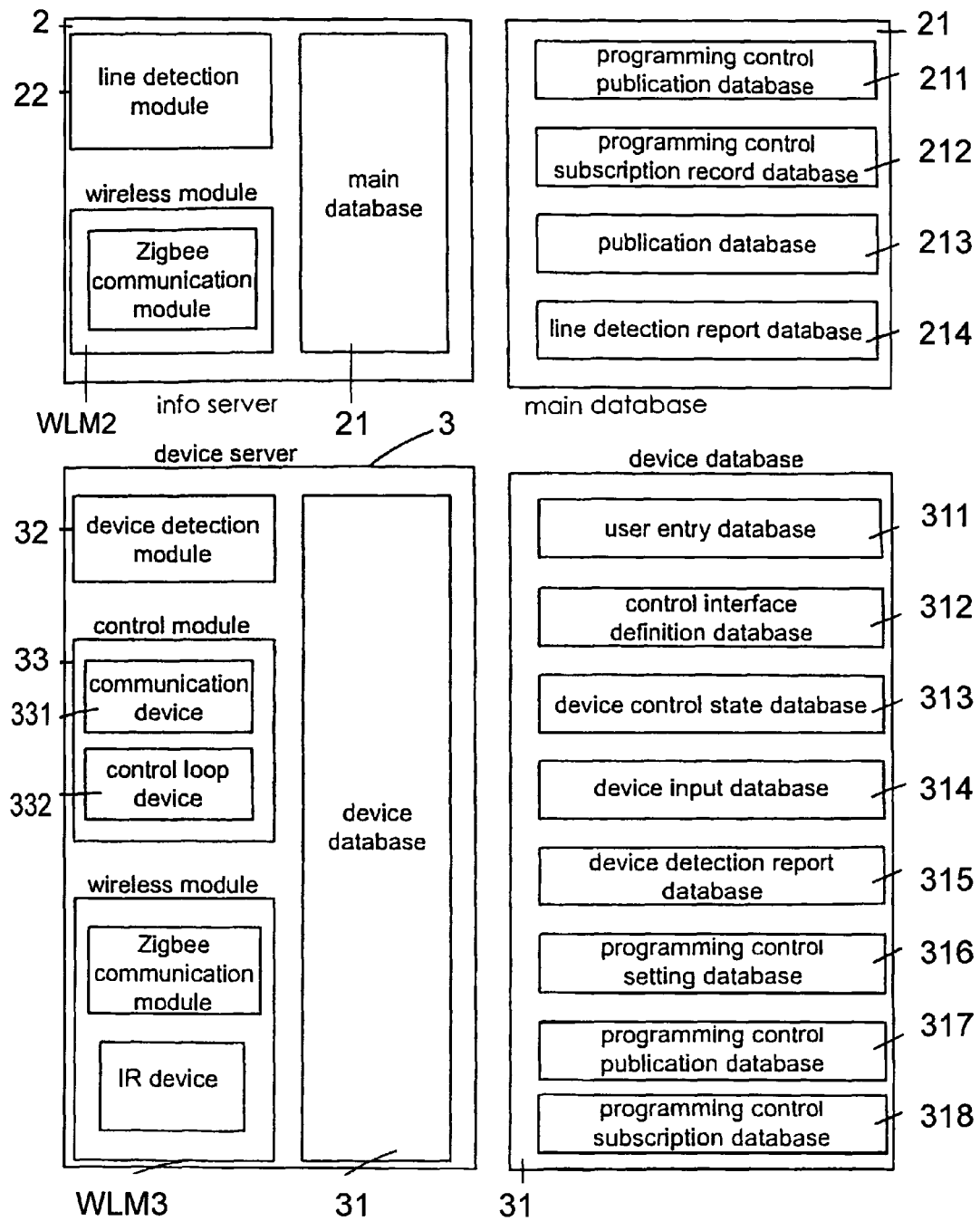
FIG. 3 is a detailed block diagram of the information server and the device server.
Figure 4:
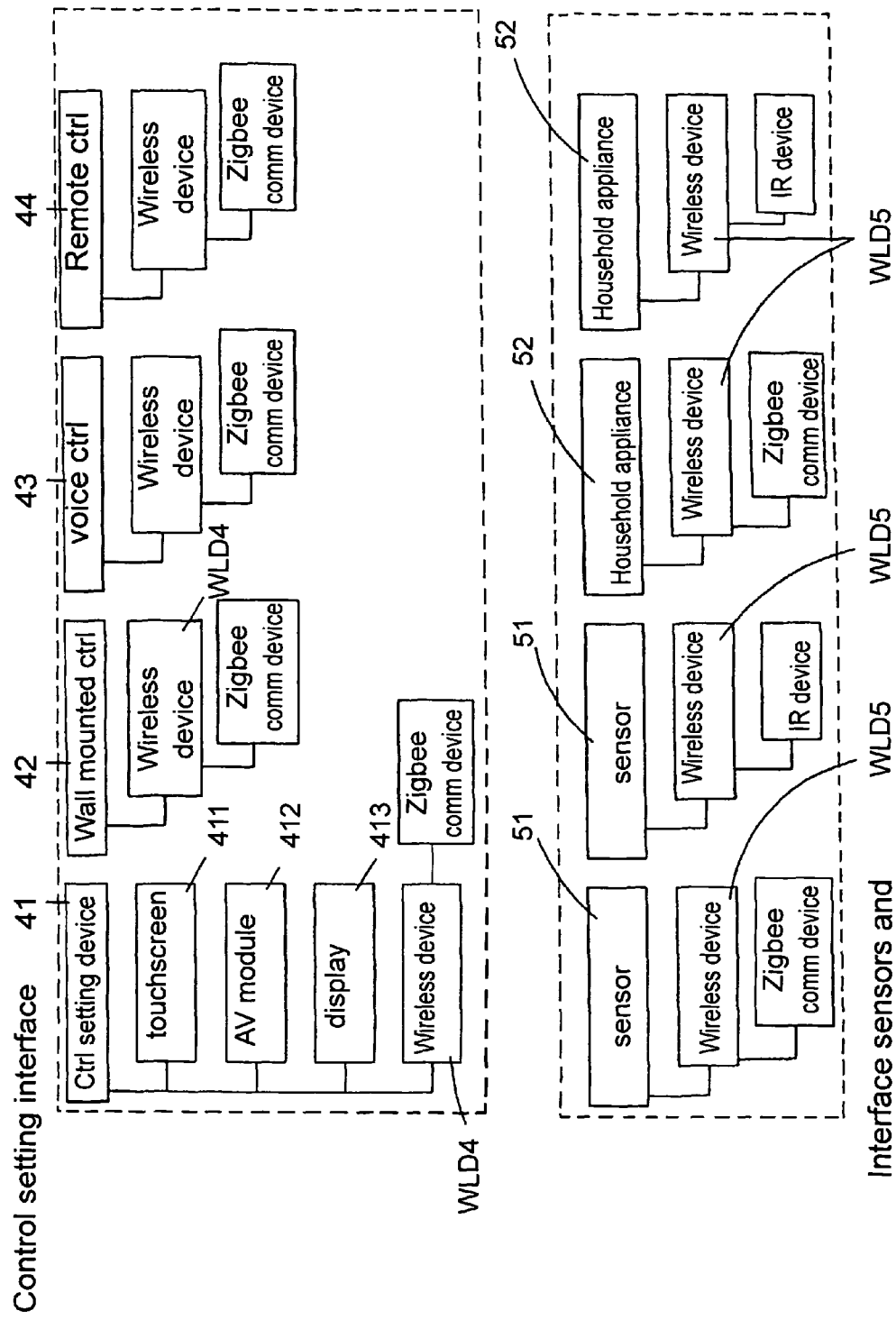
FIG. 4 is a detailed block diagram of control setting interface including control setting device, wall mounted control, voice control, and remote control, and interfaced sensors and devices.

Referring to FIGS. 1 to 4, a system 1 for controlling household appliances by programming in accordance with the invention is shown. The system 1 comprises an information server 2 and a plurality of device servers 3 in two-way communication to the information server 2 wirelessly or by wire. A control setting device 41, a wall mounted control 42, and a voice control 43 are in two-way communication to the device server 3 wirelessly or by wire; and a remote control 44 is in two-way communication to the device server 3 wirelessly. Further, a plurality of sensors 51 and a plurality of household appliances 52 are in two-way communication to the device server 3 wirelessly or by wire. The information server 2 comprises a main database 21, a line detection module 22, and a wireless module WLM2. The device server 3 comprises a device database 31, a device detection module 32, a control module 33, and a wireless module WLM3.

The wireless module WLM2 may communicate to the wireless module WLM3 wirelessly. The main database 21 and the device database 31 can store data and control information.

The control setting device 41 comprises a touchscreen 411, an audio-video (AV) module 412 for audio and video signals transmission, and a display 413 for showing messages and/or making alarm.

The device server 3 may communicate to the information server 2 by means of cable. Alternatively, the wireless module WLM3 of the device server 3 may communicate to the wireless module WLM2 of the information server 2 wirelessly.

The device server 3 may communicate to the control setting device 41, the wall mounted control 42, and the voice control 43 by means of cable. Alternatively, the device server 3 may communicate to the control setting device 41, the wall mounted control 42, and the voice control 43 wirelessly. This means that the control setting device 41, the wall mounted control 42, or the voice control 43 may communicate to the wireless module WLM3 of the device server 3 by means of a wireless device WLD4 associated therewith. The device server 3 may communicate to the remote control 44 wirelessly. This means that the remote control 44 may communicate to the wireless module WLM3 of the device server 3 by means of a wireless device WLD4 associated therewith.

The sensor 51 and the household appliance 52 may communicate to the device server 3 by wire. This means that the sensor 51 or the household appliance 52 may communicate to the device server 3 by cable. Alternatively, the sensor 51 or the household appliance 52 may communicate to the device server 3 wirelessly. This means that the sensor 51 or the household appliance 52 may communicate to the wireless module WLM3 of the device server 3 by means of a wireless device WLD5 associated therewith.

Alternatively, cable can be replaced by a power cord. The wireless module WLM2 of the information server 2 comprises a ZigBee communication module. The wireless module WLM3 of the device server 3 comprises a ZigBee communication module and an IR (infrared) device. The wireless module WLD4 of the control setting device 41, the wall mounted control 42, the voice control 43, or the remote control 44 is a ZigBee communication module. The wireless module WLD5 of the sensor 51 or the household appliance 52 is a ZigBee communication module or an IR device. The ZigBee communication module can be used for communication between devices complying with ZigBee specification. The IR device can be used for decoding or encoding and communication via IR signals.

The control module 33 comprises a communication device 331 and a control loop device 332. The line detection module 22 can detect data communication state of the wire connection of the information server 2. The device detection module 32 can detect use state of each of the control setting device 41, the wall mounted control 42, the voice control 44, the remote control 44, the sensor 51, and the household appliance 52 connected to the device server 3. The communication device 331 can send data and control instructions via communication protocols. The control loop device 332 can control the communication of data and control instructions by means of a control circuit.

The main database 21 comprises a programming control publication database 211, a programming control subscription record database 212, a publication database 213, and a line detection report database 214. The device database 31 comprises a user entry database 311, a control interface definition database 312, a device control state database 313, a device input database 314, a device detection report database 315, a programming control setting database 316, a programming control publication database 317, and a programming control subscription database 318.

The sensors 51 are thermometers, pressure sensors, smoke detectors, or the like. The household appliances 52 are lamps, air conditioners, AV devices, household appliances, heaters, access sensors or the like.

Figure 5:
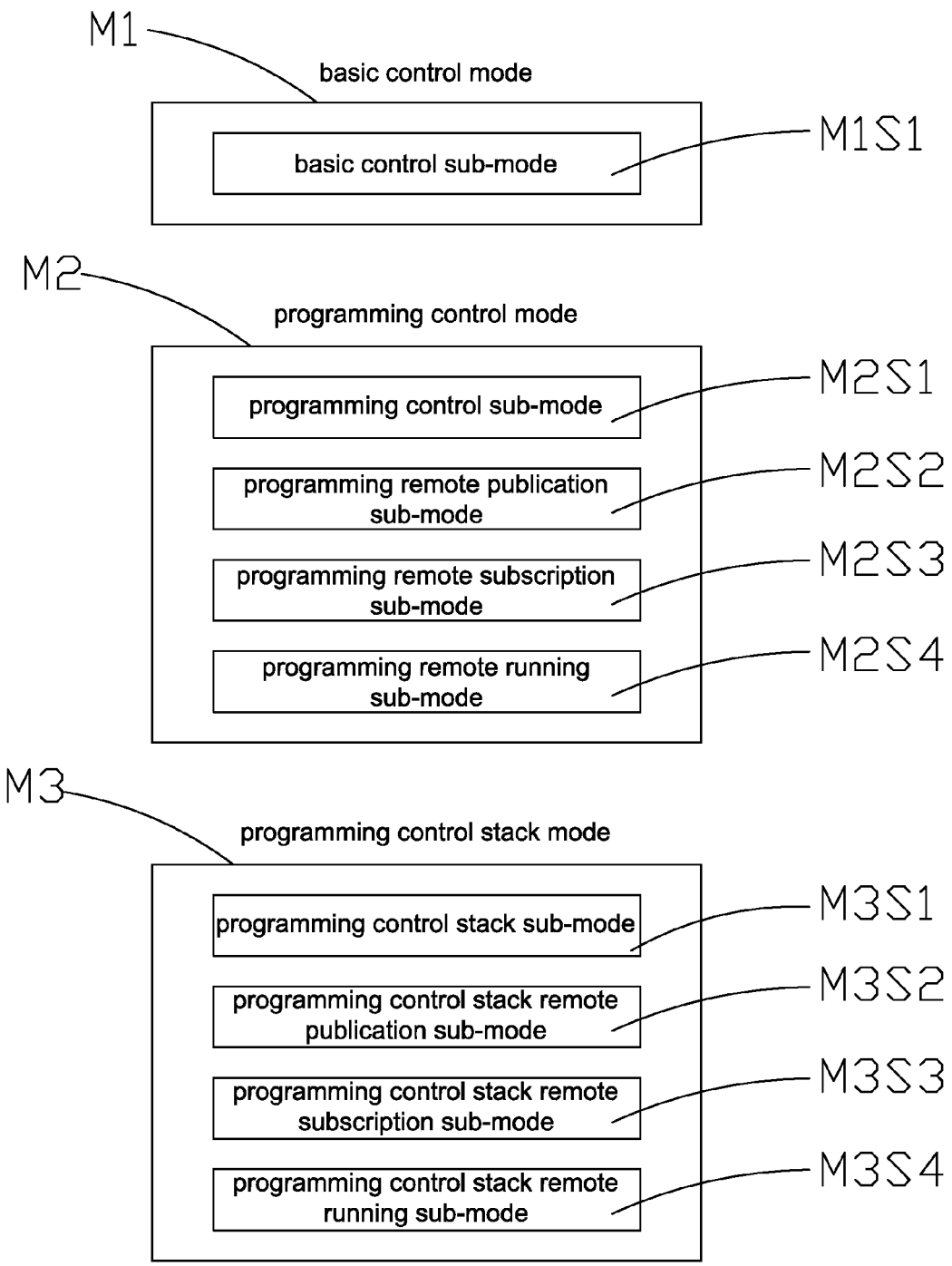
FIG. 5 is a block diagram of a number of modes for use with a method for controlling household appliances by programming according to the invention.
Figure 7:
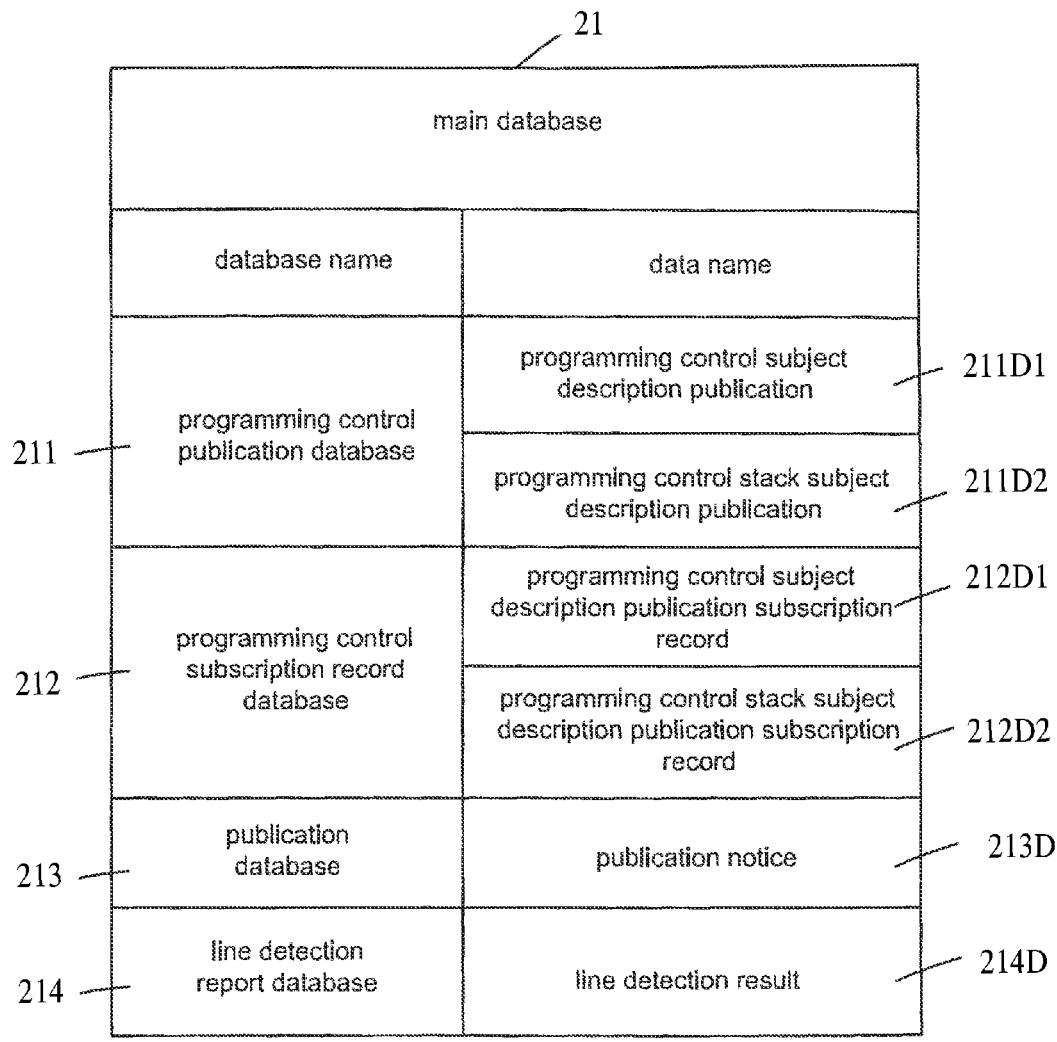
FIG. 7 is a detailed block diagram of main database.

Referring to FIGS. 5 to 11 in conjunction with FIGS. 1 to 4, a method for use in the system 1 for controlling household appliances by programming in accordance with the invention is illustrated.

A number of modes for use with the method are illustrated below. A basic control mode M1 comprises a basic control sub-mode M1S1 including instructing the device server 3 to store sensor control setting 313D1 corresponding to a use state of the sensor 51 in a device control state database 313 of the device database 31 when the sensor 51 is connected to the device server 3; and instructing the device server 3 to update the sensor control setting 313D1 in response to a change of a use state of the sensor 51.

The sensor 51 may send sensor signals 314D1 containing sensed environment state or operational result to the device server 3. And in turn, the device server 3 may store the sensor signals 314D1 in the device input database 314 of the device database 31.

The device server 3 may store device control setting 313D2 corresponding to a use state of the household appliance 52 in the device control state database 313 of the device database 31 when the household appliance 52 is connected to the device server 3. The device server 3 can be instructed to update the device control setting 313D2 in response to a change of a use state of the household appliance 52.

The household appliance 52 may send device signals 314D2 containing sensed environment state or operational result to the device server 3. And in turn, the device server 3 may store the device signals 314D2 in the device input database 314 of the device database 31.

The device detection module 32 can detect a use state of the control setting device 41, the wall mounted control 42, the voice control 43, the remote control 42, the remote controls 51 or the sensors 51 connected to the device server 3. Further, the detected use state of same is stored in the form of device detection result 315D in the device detection report database 315 of the device database 31.

The device server 3 may determine whether the device detection result 315D is correct or not. If not, the device server 3 may activate the display 413 of the control setting device 41 to show warning messages and/or make alarm.

The line detection module 22 can detect data communication state of the wire connection of the information server 2 and generate a line detection result 214D. The line detection result 214D is in turn stored in the line detection report database 214 of the main database 21.

A user may access the device database 31 of the device server 3 via the control setting device 41. Then the user may key in user name and password 311D on a page of screen corresponding to the control setting device 41. The device server 3 then compares same with records of the user entry database 311 of the device server 3 for verification.

Thereafter, the user may access the device database 31 of the device server 3 via the wall mounted control 41. The user may create a wall mounted control link setting 312D1 on a page of screen corresponding to the control setting device 41 in order to set or change a use state of the sensors 51 and/or the household appliances 52 to be controlled by the control setting device 42. The wall mounted control link setting 312D1 is stored in the control interface definition database 312.

The device server 3 may activate the wall mounted control 42 based on the wall mounted control link setting 312D1. Thus, a user may press keys of the wall mounted control 42 to set or change a use state of the sensors 51 and/or the household appliances 52.

After registering with the device server 3, a user may access the device database 31 via the control setting device 41. Further, the user may create a voice control link setting 312D2 on a page of screen corresponding to the control setting device 41 in order to set or change a use state of the sensors 51 and/or the household appliances 52 to be controlled by the wall mounted control 43. The voice control link setting 312D2 is stored in the control interface definition database 312.

The device server 3 may set the voice control 43 based on the voice control link setting 312D2. Thus, a user may input voice into the voice control 43 to set or change a use state of the sensors 51 and/or the household appliances 52.

After registering with the device server 3, a user may access the device database 31 via the control setting device 41. Further, the user may create a remote control link setting 312D3 on a page of screen corresponding to the control setting device 41 in order to set or change a use state of the sensors 51 and/or the household appliances 52 to be controlled by the remote control 44. The remote control link setting 312D3 is stored in the control interface definition database 312.

The device server 3 may set the remote control 44 based on the remote control link setting 312D3. Thus, a user may press keys of the remote control 44 to set or change a use state of the sensors 51 and/or the household appliances 52.

After registering with the device server 3, a user may access the device database 31 via the control setting device 41. Further, the user may create a sensor control setting 313D1 on a page of screen corresponding to the control setting device 41 in order to set or change a use state of the sensor 51. The sensor control setting 313D1 is stored in the device control state database 313.

The device server 3 may set the sensor 51 based on the sensor control setting 313D1 in order to set or change a use state of the sensor 51.

After registering with the device server 3, a user may access the device database 31 via the control setting device 41. Further, the user may create a device control setting 313D2 on a page of screen corresponding to the control setting device 41 in order to set or change a use state of the household appliance 52. The device control setting 313D2 is stored in the device control state database 313.

The device server 3 may set the household appliance 52 based on the device control setting 313D2 in order to set or change a use state of the household appliance 52.

Another mode for use with the method is illustrated below. A programming control mode M2 comprises a programming control sub-mode M2S1 including after registering with the device server 3, a user may access the device database 31 via the control setting device 41. Further, the user may create a programming control setting 316D1 corresponding to the sensors 51 and/or the household appliances 52 in order to set a use state of the sensors 51 and/or the household appliances 52. The programming control setting 316D1 is stored in the programming control setting database 316.

Thereafter, a user may set a use state of the sensors 51 and/or the household appliances 52 based on needs or the environment. Then the user may sequentially or synchronously enable or disable the sensors 51 and/or the household appliances 52 based on set conditions. Alternatively, the user may simultaneously enable or disable the sensors 51 and/or the household appliances 52 based on set conditions.

After registering with the device server 3, a user may access the device database 31 via the control setting device 41. Further, the user may run the programming control setting 316D1 of the programming control setting database 316.

The device server 3 may set the sensors 51 and/or the household appliances 52 based on the programming control setting 316D1 in order to set or change a use state of the sensors 51 and/or the household appliances 52.

After registering with the device server 3, a user may access the device database 31 via the control setting device 41. Further, the user may set the programming control setting 316D1 as a wall mounted control programming control setting 316D2 on a page of screen corresponding to the control setting device 41 in order to set a use state of the sensors 51 and/or the household appliances 52. The wall mounted control programming control setting 316D2 is stored in the programming control setting database 316.

The device server 3 may set the wall mounted control 42 based on the wall mounted control programming control setting 316D2. Thus, a user may press keys of the wall mounted control 42 to set or change a use state of the sensors 51 and/or the household appliances 52.

After registering with the device server 3, a user may access the device database 31 via the control setting device 41. Further, the user may set the programming control setting 316D1 as a voice control programming control setting 316D3 on a page of screen corresponding to the control setting device 41 in order to set a use state of the sensors 51 and/or the household appliances 52. The voice control programming control setting 316D3 is stored in the programming control setting database 316.

The device server 3 may set the voice control 43 based on the voice control programming control setting 316D3. Hence, a user may input voice into the voice control 43 in order to set or change a use state of the sensors 51 and/or the household appliances 52.

After registering with the device server 3, a user may access the device database 31 via the control setting device 41. Further, the user may set the programming control setting 316D1 as a remote control programming control setting 316D4 on a page of screen corresponding to the control setting device 41 in order to set a use state of the sensors 51 and/or the household appliances 52. The remote control programming control setting 316D4 is stored in the programming control setting database 316.

The device server 3 may set the remote control 44 based on the remote control programming control setting 316D4. Hence, a user may press keys of the remote control 44 to set or change a use state of the sensors 51 and/or the household appliances 52.

A user may press keys of the wall mounted control 42 to access the device database 31. Then the user may set the sensor control setting 313D1 and/or the device control setting 313D2 as a wall mounted control programming control setting 316D2 in order to set a use state of the sensors 51 and/or the household appliances 52. The wall mounted control programming control setting 316D2 is stored in the programming control setting database 316.

The device server 3 may set the wall mounted control 42 based on the wall mounted control programming control setting 316D2. Hence, a user may press keys of the wall mounted control 42 to set or change a use state of the sensors 51 and/or the household appliances 52.

A user may input voice into the voice control 43 to access the device database 31. Then the user may set the sensor control setting 313D1 and/or the device control setting 313D2 as a voice control programming control setting 316D3 in order to set a use state of the sensors 51 and/or the household appliances 52. The voice control programming control setting 316D3 is stored in the programming control setting database 316.

A user may set the voice control 43 based on the voice control programming control setting 316D3. Hence, a user may input voice into the voice control 43 to set or change a use state of the sensors 51 and/or the household appliances 52.

A user may press keys of the remote control 44 to access the device database 31. Then the user may set the sensor control setting 313D1 and/or the device control setting 313D2 as a remote control programming control setting 316D4 in order to set a use state of the sensors 51 and/or the household appliances 52. The remote control programming control setting 316D4 is stored in the programming control setting database 316.

A user may set the remote control 44 based on the remote control programming control setting 316D4. Hence, the user may press keys of the remote control 44 to set or change a use state of the sensors 51 and/or the household appliances 52.

The programming control mode M2 further comprises a programming remote publication sub-mode M2S2 including after registering with the device server 3, a user may access the device database 31 via the control setting device 41. Further, the user may set the programming control setting 316D1 as a programming control subject description 317D1 on a page of screen corresponding to the control setting device 41. Thereafter, the information server 3 may run the programming control setting 316D1 in order to set a use state of the sensors 51 and/or the household appliances 52. The programming control subject description 317D1 is stored in the programming control publication database 317.

The device server 3 sends the programming control subject description 317D1 to the information server 2. Then the information server 2 sets the programming control subject description 317D1 as a programming control subject description publication 211D1 and create a publication notice 213D in order to publish the programming control subject description 317D1 on the information server 2. The programming control subject description publication 211D1 is stored in the programming control publication database 211 and the publication notice 213D is stored in the publication database 213.

The information server 2 may publish the publication notice 213D so that a user of the device server 3 may view the publication notice 213D on the information server 2. Also, the information server 2 allows a user of the device server 3 to view the programming control subject description publication 211D1.

The programming control mode M2 further comprises a programming remote subscription sub-mode M2S3 including after registering with the device server 3, a user may access the device database 31 via the control setting device 41. Further, the user may view programming control subject description publication 211D1 on a page of screen corresponding to the control setting device 41. Furthermore, the user may set the programming control subject description publication 211D1 as subscription state.

The information server 2 may set programming control subject description publication 211D1 as a programming control subject description publication subscription 318D1 and create a programming control subject description publication subscription record 212D1 in order to store the programming control subject description 317D1 in the device server 3 and store the programming control subject description publication subscription record 212D1 in the information server 2. Further, the programming control subject description publication subscription 318D1 is stored in the programming control subscription database 318. The programming control subject description publication subscription record 212D1 is stored in the programming control subscription record database 212.

A user may run the programming control subject description publication subscription 318D1 to create a programming control setting 316D1 with respect to the sensors 51 and/or the household appliances 52 in order to set or change a use state of the sensors 51 and/or the household appliances 52. The programming control subject description publication subscription record 212D1 stored in the information server 2 is recorded with the programming control subject description 317D1, the device servers 3 publishing the programming control subject description 317D1, and the device servers 3 subscribing the programming control subject description 317D1.

The programming control mode M2 further comprises a programming remote running sub-mode M2S4 including after registering with the device server 3, a user may access the device database 31 via the control setting device 41. Further, the user may run programming control subject description publication subscription 318D1 on a page of screen corresponding to the control setting device 41.

The device server 3 may submit a control request to the information server 2 based on the programming control subject description publication subscription 318D1. Then the information server 2 may communicate to the device server 3 for confirming the control request based on the programming control subject description publication subscription 318D1.

After receiving the control request from the information server 2, the device server 3 may determine whether the programming control subject description 317D1 is true or not based on the programming control subject description publication subscription 318D1. Then the device server 3 may determine whether the programming control setting 316D1 is true or not based on the programming control subject description 317D1. The device server 3 may run the programming control setting 316D1 to set or change a use state of the sensors 51 and/or the household appliances 52.

Still another mode for use with the method is illustrated below. A programming control stack mode M3 comprises a programming control stack sub-mode M3S1 including after registering with the device server 3, a user may access the device database 31 via the control setting device 41. Further, the user may create a programming control stack setting 316D5 on a page of screen corresponding to the control setting device 41 based on the programming control subject description publication subscription 318D1. Thereafter, the user may set a use state of the sensors 51 and/or the household appliances 52 by running the programming control subject description publication subscription 318D1. The programming control stack setting 316D5 is stored in the programming control setting database 316.

Thereafter, the user may set the device servers 3 and a use state of the device servers 3 and the sensors 51 and/or the household appliances 52 connected to the device servers 3 based on needs or the environment.

After registering with the device server 3, a user may access the device database 31 via the control setting device 41. Further, the user may run the programming control stack setting 316D5 on a page of screen corresponding to the control setting device 41.

Thereafter, the device server 3 may submit a control request to the information server 2 based on the programming control subject description publication subscription 318D1. Then the information server 2 may communicate to the device server 3 for confirming the control request based on the programming control subject description publication subscription 318D1.

The device server 3 may set the sensors 51 and/or the household appliances 52 based on the programming control stack setting 316D5. Thereafter, the device server 3 may set or change a use state of the sensors 51 and/or the household appliances 52 connected to the device servers 3.

The device server 3 may determine whether the programming control subject description 317D1 is true or not based on the programming control subject description publication subscription 318D1. Then the device server 3 may determine whether the programming control setting 316D1 is true or not based on the programming control subject description 317D1. The device server 3 may run the programming control setting 316D1 to set or change a use state of the device servers 3 and the sensors 51 and/or the household appliances 52 connected to the device servers 3.

After registering with the device server 3, a user may access the device database 31 via the control setting device 41. Further, the user may set the programming control stack setting 316D5 as a wall mounted control programming control stack setting 316D6 of the wall mounted control 42 on a page of screen corresponding to the control setting device 41 in order to set a use state of the device servers 3 and the sensors 51 and/or the household appliances 52 connected to the device servers 3. The wall mounted control programming control stack setting 316D6 is stored in the programming control setting database 316.

The device server 3 may set the wall mounted control 42 based on the wall mounted control programming control stack setting 316D6. Thus, a user may press keys of the wall mounted control 42 to set or change a use state of the device servers 3 and the sensors 51 and/or the household appliances 52 connected to the device servers 3.

After registering with the device server 3, a user may access the device database 31 via the control setting device 41. Further, the user may set the programming control stack setting 316D5 as a voice control programming control stack setting 316D7 of the voice control 43 on a page of screen corresponding to the control setting device 41 in order to set a use state of the device servers 3 and the sensors 51 and/or the household appliances 52 connected to the device servers 3. The voice control programming control stack setting 316D7 is stored in the programming control setting database 316.

The device server 3 may set the voice control 43 based on the voice control programming control stack setting 316D7. Thus, a user may input voice into the voice control 43 to set or change a use state of the device servers 3 and the sensors 51 and/or the household appliances 52 connected to the device servers 3.

After registering with the device server 3, a user may access the device database 31 via the control setting device 41. Further, the user may set the programming control stack setting 316D5 as a remote control programming control stack setting 316D8 of the remote control 44 on a page of screen corresponding to the control setting device 41 in order to set a use state of the device servers 3 and the sensors 51 and/or the household appliances 52 connected to the device servers 3. The remote control programming control stack setting 316D8 is stored in the programming control setting database 316.

The device server 3 may set the remote control 44 based on the remote control programming control stack setting 316D8. Thus, a user may press keys of the remote control 44 to set or change a use state of the device servers 3 and the sensors 51 and/or the household appliances 52 connected to the device servers 3.

The programming control stack mode M3 further comprises a programming control stack remote publication sub-mode M3S2 including after registering with the device server 3, a user may access the device database 31 via the control setting device 41. Further, the user may create a programming control stack subject description 317D2 on a page of screen corresponding to the control setting device 41 based on the programming control stack setting 316D5. Thereafter, the user may set a use state of the device servers 3 and the sensors 51 and/or the household appliances 52 connected to the device servers 3 by running the programming control stack setting 316D5. The programming control stack subject description 317D2 is stored in the programming control publication database 317.

Thereafter, the device server 3 may send the programming control stack subject description 317D2 to the information server 2. Then the information server 2 may set the programming control stack subject description 317D2 as a programming control stack subject description publication 211D2 and create a publication notice 213D in order to publish the programming control stack subject description 317D2 on the information server 2. The programming control stack subject description publication 211D2 is stored in the programming control publication database 211 and the publication notice 213D is stored in the publication database 213.

The information server 2 may publish the publication notice 213D so that a user of the device server 3 may view the publication notice 213D on the information server 2. Also, the information server 2 allows a user of the device server 3 to view the programming control stack subject description publication 211 D2.

The programming control stack mode M3 further comprises a programming control stack remote subscription sub-mode M3S3 including after registering with the device server 3, a user may access the device database 31 via the control setting device 41. The device servers 3 are connected to the main database 21. Further, the user may view the programming control stack subject description publication 211 D2 on a page of screen corresponding to the control setting device 41 and set the programming control stack subject description publication 211D2 as subscription state.

The information server 2 may set programming control stack subject description publication 211D2 as a programming control stack subject description publication subscription 318D2 and create a programming control stack subject description publication subscription record 212D2 in order to store the programming control stack subject description 317D2 in the device server 3 and store the programming control stack subject description publication subscription record 212D2 in the information server 2. Further, the programming control stack subject description publication subscription 318D2 is stored in the programming control subscription database 318. The programming control stack subject description publication subscription record 212D2 is stored in the programming control subscription record database 212.

A user may run the programming control stack subject description publication subscription 318D2 to create a programming control setting 316D1 with respect to the sensors 51 and/or the household appliances 52 in order to set or change a use state of the sensors 51 and/or the household appliances 52. The programming control stack subject description publication subscription record 212D2 stored in the information server 2 is recorded with the programming control stack subject description 317D2, the device servers 3 publishing the programming control stack subject description 317D2, and the device servers 3 subscribing the programming control stack subject description 317D2.

The programming control stack mode M3 further comprises a programming control stack remote running sub-mode M3S4 including after registering with the device server 3, a user may access the device database 31 via the control setting device 41. Further, the user may view the programming control stack subject description publication subscription 318D2 on a page of screen corresponding to the control setting device 41.

Thereafter, the device server 3 may submit a control request to the information server 2 based on the programming control stack subject description publication subscription 318D2. Then the information server 2 may communicate to the device server 3 for confirming the control request based on the programming control stack subject description publication subscription 318D2.

The device server 3 may confirm the programming control stack subject description publication subscription 318D2 based on the programming control stack subject description 317D2. Then the device server 3 may confirm the programming control stack setting 316D5 based on the programming control stack subject description 317D2. The device server 3 may run the programming control stack setting 316D5 to set or change a use state of the sensors 51 and/or the household appliances 52 connected thereto.

Alternatively, the device server 3 may confirm the programming control subject description 317D1 based on the programming control stack subject description publication subscription 318D2. Then the device server 3 may confirm the programming control setting 316D1 based on the programming control subject description 317D1. The device server 3 may run the programming control setting 316D1 to set or change a use state of the sensors 51 and/or the household appliances 52 connected thereto.

While the invention herein disclosed has been described by means of specific embodiments, numerous modifications and variations could be made thereto by those skilled in the art without departing from the scope and spirit of the invention set forth in the claims.

What is claimed is:

1. A household appliances control method for a household appliances control system including an information server comprising a main database, a line detection module, and a wireless module, a plurality of device servers comprising a device database, a device detection module, a control module, and a wireless module and being in two-way communication to the information server wirelessly or by wire, a control setting device being in two-way communication to each of the device servers wirelessly or by wire, a wall mounted control being in two-way communication to each of the device servers wirelessly or by wire, a voice control being in two-way communication to each of the device servers wirelessly or by wire, a remote control being in two-way communication to each of the device servers wirelessly, a plurality of sensors being in two-way communication to each of the device servers wirelessly or by wire, and a plurality of household appliances being in two-way communication to each of the device servers wirelessly or by wire, the method household appliances control method comprising:
- a basic control step comprising a basic control sub-step including instructing the device server to store a sensor control setting corresponding to a use state of one of the sensors in a device control state database of the device database when the sensor is connected to the device server; and instructing the device server to update the sensor control setting in response to a change of a use state of the sensor wherein the device server updates a device control setting in response to a change of a use state of one of the household appliances wherein after registering with the device server, a user accesses the device database via the control setting device; the user creates a voice control link setting to set or change a use state of the sensor and/or the household appliance to be controlled by the wall mounted control; the device server sets the voice control based on the voice control link setting; the user inputs voice into the voice control to set or change the use state of the sensor and/or the household appliance; after registering with the device server, the user accesses the device database via the control setting device; the user creates a remote control link setting to set or change the use state of the sensor and/or the household appliance to be controlled by the remote control; the device server sets the remote control based on the remote control link setting; the user presses keys of the remote control to set or change the use state of the sensor and/or the household appliance; after registering with the device server, the user accesses the device database via the control setting device; the user creates a sensor control setting to set or change the use state of the sensor; the device server sets the sensor based on the sensor control setting to set or change the use state of the sensor; after registering with the device server, the user accesses the device database via the control setting device; the user creates a device control setting to set or change the use state of the household appliance; and the device server sets the household appliance based on the device control setting to set or change the use state of the household appliance;
- a programming control step comprising (a) a programming control sub-step including after registering with the device server, allowing the user to access the device database via the control setting device wherein the user creates a programming control setting corresponding to the sensor and/or the household appliance in order to set the use state of the sensor and/or the household appliance; the user sets the use state of the sensor and/or the household appliance; the user sequentially or synchronously enables or disables the sensors and/or the household appliances based on set conditions; after registering with the device server, the user accesses the device database via the control setting device; the user runs the programming control setting; the device server sets the sensors and/or the household appliances based on the programming control setting in order to set or change the use state of the sensor and/or the household appliance; after registering with the device server, the user accesses the device database via the control setting device; the user sets the programming control setting as a wall mounted control programming control setting in order to set the use state of the sensor and/or the household appliance; the device server sets the wall mounted control based on the wall mounted control programming control setting; the user presses keys of the wall mounted control to set or change the use state of the sensor and/or the household appliance; after registering with the device server, the user accesses the device database via the control setting device; the user sets the programming control setting as a voice control programming control setting in order to set the use state of the sensor and/or the household appliance; the device server sets the voice control based on the voice control programming control setting; the user inputs voice into the voice control to set or change the use state of the sensor and/or the household appliance; after registering with the device server, the user accesses the device database via the control setting device; the user sets the programming control setting as a remote control programming control setting in order to set the use state of the sensor and/or the household appliance; the device server sets the remote control based on the remote control programming control setting; the user presses the keys of the remote control to set or change the use state of the sensor and/or the household appliance; the user presses the keys of the wall mounted control to access the device database; the user sets the sensor control setting and/or the device control setting as a wall mounted control programming control setting in order to set the use state of the sensor and/or the household appliance; the device server sets the wall mounted control based on the wall mounted control programming control setting; the user presses the keys of the wall mounted control to set or change the use state of the sensor and/or the household appliance; the user inputs voice into the voice control to access the device database; the user sets the sensor control setting and/or the device control setting as a voice control programming control setting in order to set the use state of the sensor and/or the household appliance; the user sets the voice control based on the voice control programming control setting; the user inputs voice into the voice control to set or change the use state of the sensor and/or the household appliance; the user presses the keys of the remote control to access the device database; the user sets the sensor control setting and/or the device control setting as a remote control programming control setting in order to set the use state of the sensor and/or the household appliance; the user sets the remote control based on the remote control programming control setting; and the user presses the keys of the remote control to set or change the use state of the sensor and/or the household appliance; (b) a programming remote publication sub-step including after registering with the device server, the user accesses the device database 1 via the control setting device; the user sets the programming control setting as a programming control subject description; the information server runs the programming control setting to set the use state of the sensor and/or the household appliance; the device server sends the programming control subject description to the information server; the information server sets the programming control subject description as a programming control subject description publication and creates a publication notice in order to publish the programming control subject description on the information server; the information server publishes the publication notice so that the user of the device server views the publication notice on the information server; and the information server allows the user of the device server to view the programming control subject description publication; (c) a programming remote subscription sub-step including after registering with the device server, the user accesses the device database via the control setting device; the user views the programming control subject description publication; the user sets the programming control subject description publication as a subscription state; the information server sets the programming control subject description publication as a programming control subject description publication subscription and creates a programming control subject description publication subscription record; the user runs the programming control subject description publication subscription to create a programming control setting with respect to the sensor and/or the household appliance in order to set or change the use state of the sensor and/or the household appliance; and the programming control subject description publication subscription record is recorded with the programming control subject description, the device servers publishing the programming control subject description, and the device servers subscribing the programming control subject description; and (d) a programming remote running sub-step including after registering with the device server, the user accesses the device database via the control setting device; the user runs the programming control subject description publication subscription; the device server submits a control request to the information server based on the programming control subject description publication subscription; the information server communicates to the device server for confirming the control request based on the programming control subject description publication subscription; and the device server runs the programming control setting to set or change the use state of the sensor and/or the household appliance; and a programming control stack step comprising (a) a programming control stack sub-step including after registering with the device server, the user accesses the device database via the control setting device; the user creates a programming control stack setting based on the programming control subject description publication subscription; the user sets the use state of the sensor and/or the household appliance by running the programming control subject description publication subscription; the user sets the device servers, a use state of the device servers, and the use state of the sensor and/or the household appliance connected to the device servers; after registering with the device server, the user accesses the device database via the control setting device; the user runs the programming control stack setting; the device server submits a control request to the information server based on the programming control subject description publication subscription; the information server communicates to the device server for confirming the control request based on the programming control subject description publication subscription; the device server sets the sensor and/or the household appliance based on the programming control stack setting; the device server sets or changes the use state of the sensor and/or the household appliance; the device server verifies the programming control subject description based on the programming control subject description publication subscription; the device server verifies the programming control setting based on the programming control subject description; the device server runs the programming control setting to set or change the use state of the device servers and the use state of the sensor and/or the household appliance; after registering with the device server, the user accesses the device database via the control setting device; the user sets the programming control stack setting as a wall mounted control programming control stack setting of the wall mounted control in order to set the use state of the device servers and the use state the sensor and/or the household appliance; the device server sets the wall mounted control based on the wall mounted control programming control stack setting; the user press keys of the wall mounted control to set or change the use state of the device servers and the use state of the sensor and/or the household appliance; after registering with the device server, the user accesses the device database via the control setting device; the user sets the programming control stack setting as a voice control programming control stack setting of the voice control in order to set the use state of the device servers and the use state of the sensor and/or the household appliance; the device server sets the voice control based on the voice control programming control stack setting; the user inputs voice into the voice control to set or change the use state of the device servers and the use state of the sensor and/or the household appliance; after registering with the device server, the user accesses the device database via the control setting device; the user sets the programming control stack setting as a remote control programming control stack setting of the remote control in order to set the use state of the device servers and the use state of the sensor and/or the household appliance; the device server sets the remote control based on the remote control programming control stack setting; and the user presses the keys of the remote control to set or change the use state of the device servers and the use state of the sensor and/or the household appliance; (b) a programming control stack remote publication sub-step including after registering with the device server, the user accesses the device database via the control setting device; the user creates a programming control stack subject description based on the programming control stack setting; the user sets the use state of the device servers and the use state of the sensor and/or the household appliance by running the programming control stack setting; the device server sends the programming control stack subject description to the information server; the information server sets the programming control stack subject description as a programming control stack subject description publication and creates a publication notice in order to publish the programming control stack subject description on the information server; the information server publishes the publication notice so that the user of the device server views the publication notice on the information server; and the information server allows the user of the device server to view the programming control stack subject description publication; (c) a programming control stack remote subscription sub-step including after registering with the device server, the user accesses the device database via the control setting device; the user views the programming control stack subject description publication and sets the programming control stack subject description publication as a subscription state; the information server sets the programming control stack subject description publication as a programming control stack subject description publication subscription and creates a programming control stack subject description publication subscription record; the user runs the programming control stack subject description publication subscription to create a programming control setting with respect to the sensor and/or the household appliance in order to set or change the use state of the sensor and/or the household appliance; the programming control stack subject description publication subscription record is recorded with the programming control stack subject description, the device servers publishing the programming control stack subject description, and the device servers subscribing the programming control stack subject description; and (d) a programming control stack remote running sub-step including after registering with the device server, the user accesses the device database via the control setting device; the user views the programming control stack subject description publication subscription; the device server submits a control request to the information server based on the programming control stack subject description publication subscription; the information server communicates to the device server for confirming the control request based on the programming control stack subject description publication subscription; the device server verifies the programming control stack subject description publication subscription based on the programming control stack subject description; and the device server runs the programming control stack setting to set or change the use state of the sensor and/or the household appliance.

* * * * *